United States Patent
Midkiff (10) Patent No.: US 6,416,672 B1
(45) Date of Patent: Jul. 9, 2002

(54) REMOVAL OF DISSOLVED AND COLLOIDAL SILICA

(75) Inventor: William S. Midkiff, Ruidoso, NM (US)

(73) Assignee: The Regents of the University of California, Los Alamos, NM (US)

(*) Notice: Subject to any disclaimer, the term of this patent is extended or adjusted under 35 U.S.C. 154(b) by 0 days.

(21) Appl. No.: 09/648,072

(22) Filed: Aug. 25, 2000

(51) Int. Cl.⁷ .................................................. C02F 1/58
(52) U.S. Cl. ............... 210/714; 210/661; 210/683; 210/712; 210/715; 210/724; 210/737
(58) Field of Search ................. 210/667, 696, 210/712, 714, 724, 902, 661, 683, 715, 737; 252/175, 181

(56) References Cited

U.S. PATENT DOCUMENTS

| | | | |
|---|---|---|---|
| 3,775,088 A | 11/1973 | Higgins | 71/1 |
| 4,016,075 A | 4/1977 | Wilkins | 210/42 R |
| 4,188,291 A | 2/1980 | Anderson | 210/23 H |
| 4,276,180 A | 6/1981 | Matson | 210/683 |
| 4,370,858 A | 2/1983 | Awerbuch et al. | 60/641.5 |
| 4,405,463 A | 9/1983 | Jost et al. | 210/712 |
| 4,602,999 A * | 7/1986 | Furusho | 210/669 |
| 4,728,438 A | 3/1988 | Featherstone et al. | 210/713 |
| 4,765,913 A | 8/1988 | Featherstone | 210/714 |
| 5,351,523 A | 10/1994 | Blackford et al. | 73/38 |
| 5,409,614 A | 4/1995 | Gallup et al. | 210/700 |
| 5,595,717 A | 1/1997 | Harper et al. | 423/339 |
| 5,609,765 A | 3/1997 | Bowman | 210/638 |
| 6,051,141 A * | 4/2000 | Forbes et al. | 210/667 |
| 6,074,983 A * | 6/2000 | Derolf et al. | 502/407 |

FOREIGN PATENT DOCUMENTS

EP 159578 A * 10/1985

* cited by examiner

Primary Examiner—Peter A. Hruskoci
(74) Attorney, Agent, or Firm—Gemma Morrison Bennett; Samuel L. Borkowsky (57) ABSTRACT

Small amorphous silica particles are used to provide a relatively large surface area upon which silica will preferentially adsorb, thereby preventing or substantially reducing scaling caused by deposition of silica on evaporative cooling tower components, especially heat exchange surfaces. The silica spheres are contacted by the cooling tower water in a sidestream reactor, then separated using gravity separation, microfiltration, vacuum filtration, or other suitable separation technology. Cooling tower modifications for implementing the invention process have been designed.

5 Claims, 5 Drawing Sheets

MU = makeup
BD = blowdown
$Q_c$ = flowrate, circulating water
$Q_{ss}$ = flowrate, sidestream $T_{ss}$ = temperature, sidestream
$T_1$ = temperature, into heat exchanger
$T_2$ = temperature, out of heat exchanger
$\Delta T$ = temperature drop across cooling tower

REMOVAL OF DISSOLVED AND COLLOIDAL SILICA

This invention was made with government support under Contract No. W-7405-ENG-36 awarded by the U.S. Department of Energy. The government has certain rights in the invention.

TECHNICAL FIELD

This invention relates to a process and apparatus for removal of silica from water, especially circulating water in a cooling tower.

BACKGROUND ART

Naturally occurring silica dissolved or suspended in water circulated in evaporative cooling towers tends to come out of solution when the water is subjected to evaporation concentration. Because silica solubility is inversely temperature dependent to that of calcium carbonate, silica will become supersaturated in the hot portions of circulating water loops in evaporative cooling towers. Calcium carbonate is less solutble in the hot portions of the circulating water loops. Silica may co-deposit on the crystal matrices of either scale or corrosion products that occur in the circulating water loops. Co-deposits of silica may occur at silica concentrations that are less than the saturation concentration for amorphous silica alone. Any of these forms of deposition can restrict water flow and heat exchange.

Chemical treatment using chelates or sequestrants, water softening agents, or pH control have been used to prevent deposition and scale formation with varying degrees of success. For example, dissolved and colloidal silica is commonly removed from water by increasing the pH above 10.5 to convert the silica from acid to predominantly silicate ions, then adding a source of magnesium such as magnesium sulfate or magnesium chloride, after which a source of hydroxide ion is added to precipitate magnesium hydroxide. If the hydroxide ion source is lime, calcium carbonate is also formed. Iron and organic polyelectrolytes are also commonly added to assist settling of floc. Large quantities of sludge and dissolved solids are left in the water being treated. In general, use of chemical treatments greatly increases the amounts of water consumption and creates undesirable waste streams.

Chemically preventing deposition of calcium carbonate in heat exchanges has been used to reduce co-deposition of silica in the heat exchangers. However, in the cooler parts of the system such as on the tower fill, deposition of silica is not prevented by preventing deposition of calcium carbonate.

Numerous patents and other publications describe attempts to remove silica from water and, conversely, attempts to keep the silica in solution as the water is heated, cooled or evaporated or some combination thereof, to prevent deposition of the silica on cooling tower surfaces or other surfaces. Some of these include: U.S. Pat. No. 4,276,180 which discloses removal of silica from waste-water streams by passing the water over activated alumina which is regenerated for reuse and which generates a large waste stream; and U.S. Pat. No. 4,370,858 which discloses use of in situ generated silica particles or pre-treated particles of metal to remove silica from hot water in a solids contact clarification reaction downstream of an energy recovery unit.

There is still a need for ways of preventing deposition of silica on evaporative cooling tower surfaces, particularly where it diminishes heat transfer and water flow.

An object of this invention is to provide a method and apparatus for preventing silica deposition on heat-exchange surfaces contacted with aqueous silica solutions.

Another object of this invention to provide a method of removing silica from water by providing a surface for preferential deposition of the silica.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentality's and combinations particularly pointed out in the appended claims.

DISCLOSURE OF INVENTION

To achieve the foregoing and other objects, and in accordance with the purposes of the present invention, as embodied and broadly described herein, there has been invented a process in which small amorphous nucleation site material particles are used to provide a relatively large surface area upon which silica will preferentially adsorb, thereby preventing or substantially reducing scaling caused by deposition of silica on evaporative cooling tower components, especially heat exchange surfaces. The silica spheres are contacted by the cooling tower water in a sidestream reactor, then separated using gravity separation, microfiltration, vacuum filtration, centrifugal separation, or other suitable separation technology. Cooling tower modifications for implementing the invention process have been designed.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings.

BEST MODES FOR CARRYING OUT THE INVENTION

It has been discovered that by offering an attractive alternate surface area that statistically overwhelms the surface areas in evaporative cooling tower operating equipment, it is possible to get silica dissolved or suspended in cooling tower water to preferentially deposit on the alternate surface area. The decreased solubility of silica resulting from the temperature drops across the evaporative cooling tower provides the driving force for silica removal by deposition on the alternate surface areas which are provided.

Deposition of silica is dependent upon such factors as temperature (higher deposition occurs at lower temperatures); pH of the system; amount of surface area available for deposition; saturated silica solubility levels in the water from which the silica is depositing; and availability of nucleation sites.

Amorphous silica, particularly when in colloidal form, tends to deposit on surfaces that have some crystal structure or that have some previous amorphous silica deposits. These nucleation sites can be corrosion products such as iron oxide, zinc oxide, or aluminum oxide, or they can be scale deposits from the water, such as calcite or calcium carbonate. In the case of crystal matrices such as calcium carbonate, co-deposition with silica can occur with the co-deposition shifting into largely pure silica deposition, depending upon silica concentrations in the circulating water, temperatures, and presence of chemical treatments for the calcium carbonate deposition. In the case of metal oxides, the metal oxides work as adsorbent surface areas for silica in aqueous or colloidal form. As the percentage of amorphous silica deposited increases, the external surface begins to be made up entirely of amorphous silica deposited on amorphous silica.

Temperatures in the heat exchanger of an evaporative cooling tower are significantly higher than temperatures in other parts of the system. Any deposition of silica will tend to be in the lower temperature portions of the system and no deposition of silica will occur in the hot areas if the surfaces in the hot areas can be kept free from other scale and corrosion products. Therefore, it is presently preferred to provide the alternative deposition surfaces of this invention in the coldest part of the circulating water loop as a sidestream treatment.

Generally little or no pH adjustment is needed since silica will readily adsorb onto the target surfaces provided in this invention at pHs anywhere in the range from about 8 to about 9. This is in contrast to lime or magnesia processes which require that pH be raised high enough to substantially convert silica acid into silicate ions, i.e., usually a pH greater than 10.

The attractive alternate deposition surface area of this invention can be provided in a sidestream treatment facility with a controlled temperature and mixing environment in which evaporation concentrated silica would deposit preferentially on the alternate surface area rather than on surfaces in the cooling tower system. The sidestream treatment facility has: (a) a reactor vessel where the alternate surface is contacted with the water to be treated; (b) separation equipment for separating the spent or coated alternate surface material from the treated water; and (c) conduits as needed to connect the reactor vessel with the water circulation system of the cooling tower and separation equipment; and (d) pumps as needed to circulate fluid through the reactor vessel.

Preferably, the sidestream treatment system is sized to remove silica as fast as the cooling water becomes supersaturated through evaporation and cooling. The cycles of concentration can be increased until other factors such as total dissolved solids or calcium and magnesium content reach scale-forming concentrations in excess of what the cooling tower water treatment additives will control.

Figure 1:
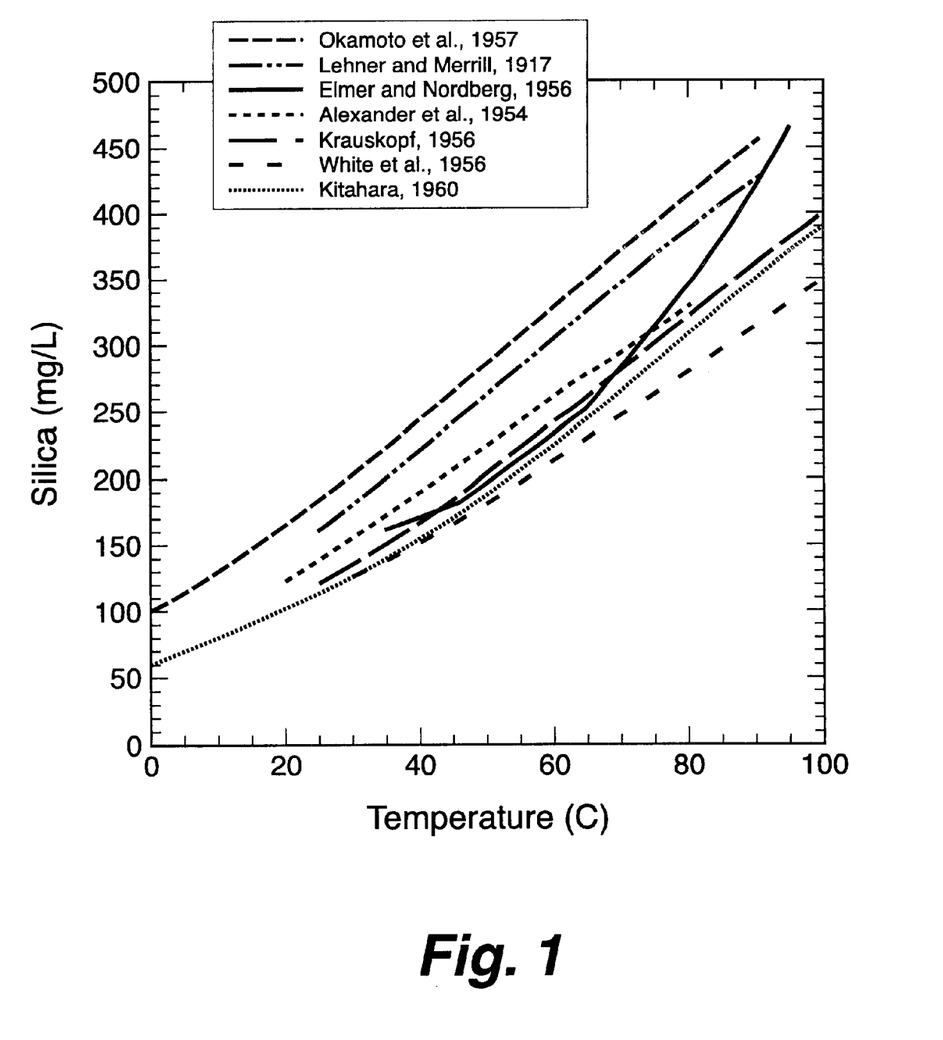
FIG. 1 is a graph of silica solubilities in water as a function of temperature.

A compilation of silica solubilities as a function of temperature from several references which were collected in Morey et al., 1964, is presented in FIG. 1. All of the curves have basically the same slope. Because most dynamic evaporative cooling tower systems tend to establish an operational steady state rather than an absolute equilibrium, the upper curve is believed to be the most useful. The upper curve gives a value of 165 mg/L at 20° C. The curve is close to linear above 20° C. and increases to 325 mg/L at 60° C. The slope then is 160 mg/L per 40° C., or 4 mg/L per ° C. In ° F., that is $(5/9) \times 4 = 2.2$ mg/L per ° F. A 15° F. drop across a cooling tower represents a difference in solubility of 33 mg/L of silica in water. It is this difference in solubility that is the driving force for silica removal by offering a very large alternative surface area relative to that of the smaller, less attractive surface areas of the cooling tower for deposition of the silica.

The driving force for supersaturation of silica in the water can be further increased by cooling the sidestream treatment process to a temperature below the lowest temperature of the water in the cooling tower. For example, if the sidestream treatment process is 30° F. lower than the hottest portion of the cooling tower circulating water loop, the driving force for silica deposition is 67 mg/L silica instead of the 33 mg/L silica difference provided by cooling tower operation with a temperature drop of 15° F.

Small amorphous silica particles, including, but not limited to, synthesized spheres, beads or droplets, can be used in practice of the invention. Small amorphous silica spheres manufactured using pyrogenic processes are generally non-porous and non-soluble enough to serve well in the invention method. Silica spheres formed by other than pyrogenic processes also can be used in the invention. Alternatively, metal oxides such as zinc oxide or iron oxide can be used as seed crystals in the sidestream reactor so that the first silica depositions on the oxide crystals form the alternative silica surfaces for subsequent silica deposition.

Materials presently preferred for removal of silica in accordance with the invention are pure amorphous silica spheres, and particularly pyrogenically formed silica spheres, because of the uniformity of size of these spheres and because of the advantages of using deposition material with a surface of the same material as the material targeted for deposition.

Large concentrations of small spheres offer a large surface area in a relatively small volume. Rapid increases in the area to volume ratio can be achieved by use of smaller particles. For example, the surface area of a 55-gallon volume of 40-micron silica spheres with a specific gravity of 2.2 is 300 $m^2/g$, which is the equivalent of 23,000 football fields.

A quantity of silica spheres sufficient to provide adequate sphere surface area to statistically overwhelm the surface areas where silica deposition is unwanted is needed. A quantity of silica spheres that can provide an alternate surface area in the range from about 100 times to about 100,000,000 times the surface area of the cooling tower system wetted surface is generally useful in the invention. More preferable is quantity of silica spheres that can provide an alternate surface area in the range from about 1000 times to about 10,000,000 times the surface area of the cooling tower system wetted surface and generally presently preferred is a quantity of silica spheres that can provide an alternate surface area in the range from about 10,000 times to about 1,000,000 times the surface area of the cooling tower system wetted surface.

Use of too few silica spheres or silica spheres which are too large will result in lack of sufficient preferential surface area for deposition and hence will provide less completely effective prevention of silica deposition onto water cooling tower surfaces. Use of silica spheres that are too small will cause excessive pressure losses, reduced treatment velocities, increased problems with sphere retention in the reactor, and will make separation of the spheres more difficult. Use of too many spheres will be uneconomical.

The sphere size is selected to be large enough to have a settling velocity equal to the rise velocity in the sidestream reactor or equipment through which the water to be treated is circulated. Some form of fluidized bed is postulated as most effective for the proposed silica adsorption process, although other types of reactors can be used.

The silica spheres grow as silica adsorption occurs, resulting in larger particles with greater settling velocity. Therefore, the larger particles can be separated from the smaller ones by varying rise velocity of the water being treated by cycling them through a sidestream reactor, preferably a conically shaped reactor. Heavier, "spent" or coated spheres can be removed from the process and fresh, small spheres can be added to replace the "spent" spheres.

Additional or alternative equipment and separating and handling techniques can be used to separate and remove the "spent" silica spheres or other nucleation sites. These include micro strainers, filters, strainers, vacuum filters, gravity separation or other suitable techniques. In another embodiment of the invention, the entire sidestream reactor may serve as a disposable cooling tower water treatment cannister.

Figure 2:
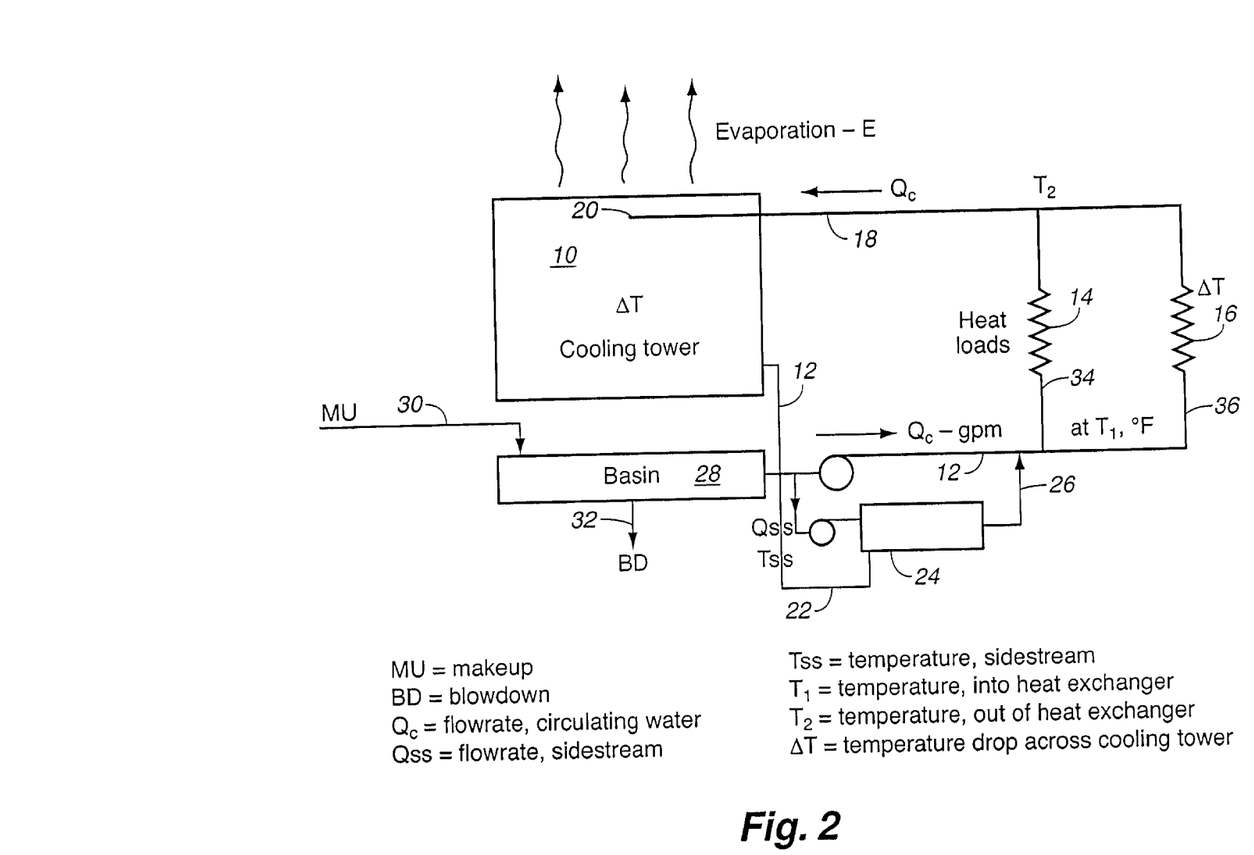
FIG. 2 is a schematic of an example of an equipment set up for sidestream silica treatment in a cooling tower circulating loop in accordance with the invention process.

FIG. 2 is a schematic of an example of how the sidestream equipment for the invention process is incorporated into an evaporative cooling tower system. With reference to FIG. 2, a cooling tower 10 has a circulating water conduit 12 for circulating water through heat exchangers 14, 16 and back to the tower deck 20 in the upper portion of the cooling tower 10. A second conduit 22 connects the circulating water conduit 12 into the lower portion of a sidestream reactor 24 for sorption treatment. The sidestream reactor 24 has an outlet conduit 26 for returning water to the circulating water conduit 12. A tower basin 28 has the usual inlet 30 for adding make up water. The usual outlet 32 for release of blow down water is normally directed from the tower basin 28 or from the circulating water conduit 12.

Still with reference to FIG. 2, the sidestream reactor 24 contains the nucleation site material such as silica spheres. The cooling tower water flows up through the nucleation site material in the sidestream reactor 24 so that there is maximum contact of the water to be treated with the surfaces of the nucleation site material particles in the sidestream reactor 24. Silica that is in colloidal suspension or dissolved in the cooling tower water deposits preferentially onto the nucleation site material particles in sidestream reactor the 24. Water that has been circulated across the surfaces of the nucleation site material particles in the sidestream reactor 24 is then conducted from the sidestream reactor 24 through conduit 26 into the circulating water conduit 12. Water from the circulating water conduit 12 is conducted through conduits 34, 36 where the water passes through one or more heat exchangers 14, 16 and thence through a conduit 18 back into the circulating water conduit 12 that continues to the upper portion 20 of the evaporative cooling tower 10.

FIGS. 3, 4a, 4b and 5 are schematic drawings of examples of sidestream equipment which can be used for treatment of the cooling tower water and separation of the spent spheres from the adsorption process.

Figure 3:
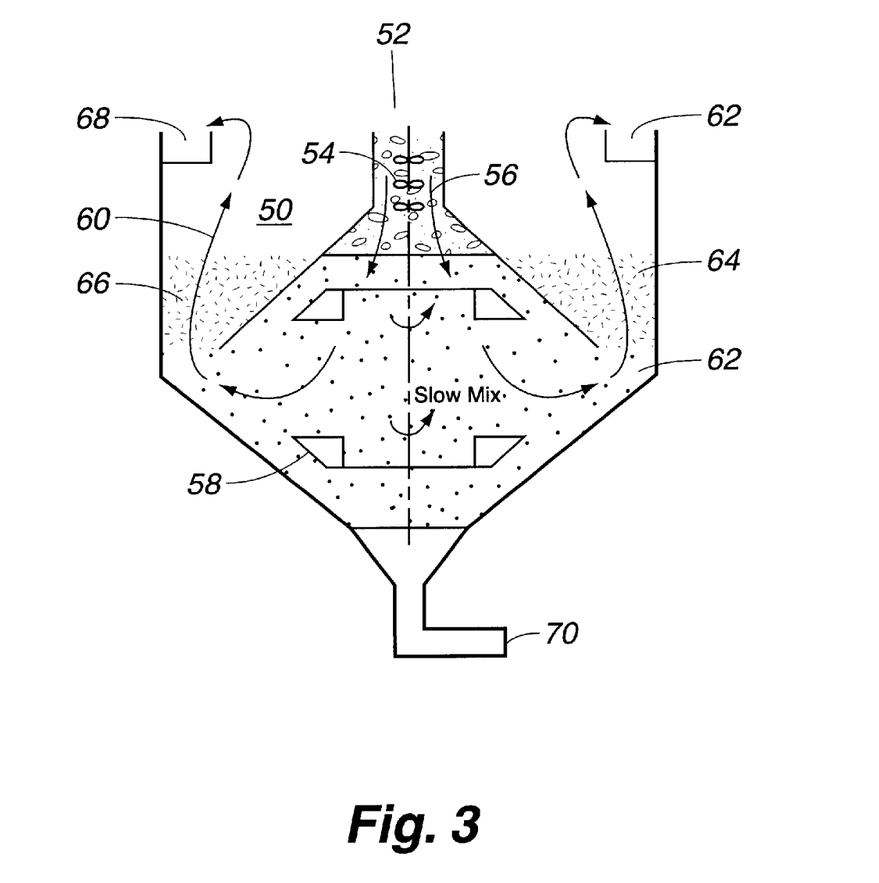
FIGS. 3, 4 and 5 are drawings of examples of sidestream equipment for contacting cooling tower water with the silica spheres and separation of the spent silica spheres.

FIG. 3 depicts a sidestream clariflocculator reactor for treating potable surface water in accordance with the invention. The reactor 50 has a central intake port 52 through which raw untreated water and nucleation site material can be introduced. Vanes 54 or any suitable device in a rapid mix zone 56 distributes the nucleation site material in the flow of water coming into the sidestream reactor 50. Other larger vanes 58, mixing propellers or other mixing devices are used to circulate the water along a water path 60 about the reactor in a slow mix zone-62, thereby maximizing contact of the water with the nucleation site material.

After contact with the nucleation site material, the treated water is circulated up through a sludge blanket 64 which acts as a dynamic filter in a settling zone 66 and into a wier 68 from which the clarified water is removed.

An outlet 70 at the bottom of the sidestream reactor 50 is provided for removal of the "spent" or silicated nucleation site material which has been built up to larger particle sizes by deposition of the silica from the water being treated.

Figure 4A:
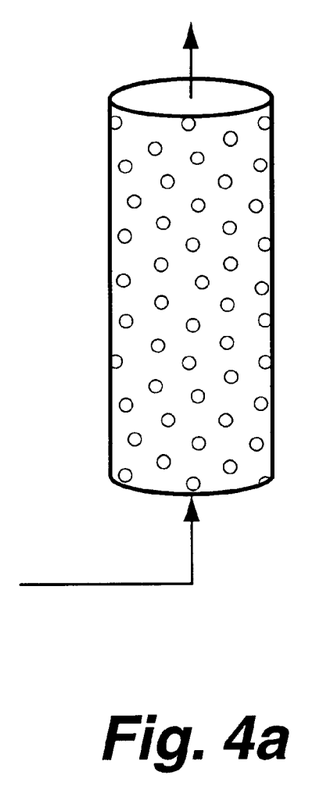
Figure 4B:
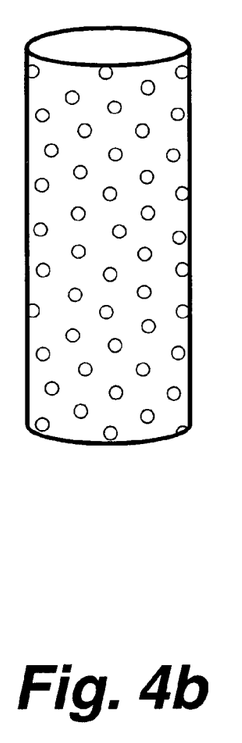

FIGS. 4a and 4b are schematics of a Higgins type ion exchange reactor which can be used as the sidestream treatment reactor in practice of the invention. The Higgins type reactor is an upflow fluidized bed which can be loaded with the nucleation-site material of the invention. This particular sidestream reactor is then operated in a pulsed mode with the water being pumped through the reactor for a period of time sufficient to allow the sorptive media to grow to the selected pre-determined size, and then turned off so solids are allowed to settle. A period of settlement time in the range from a few seconds to about 5 minutes is generally sufficient for adequate settling of the nucleation site material. FIG. 4a shows even distribution of the nucleation site material when the sidestream reactor is in operation. FIG. 4b shows the distribution of the nucleation site material when the sidestream reactor is turned off after a period of operation. As shown, the larger particles have settled faster and are therefore concentrated in the bottom of the reactor. The large, exhausted particles can be removed from the bottom of the reactor in a pulse while fresh, small particles are added to the top of the reactor in a pulse.

Figure 5:
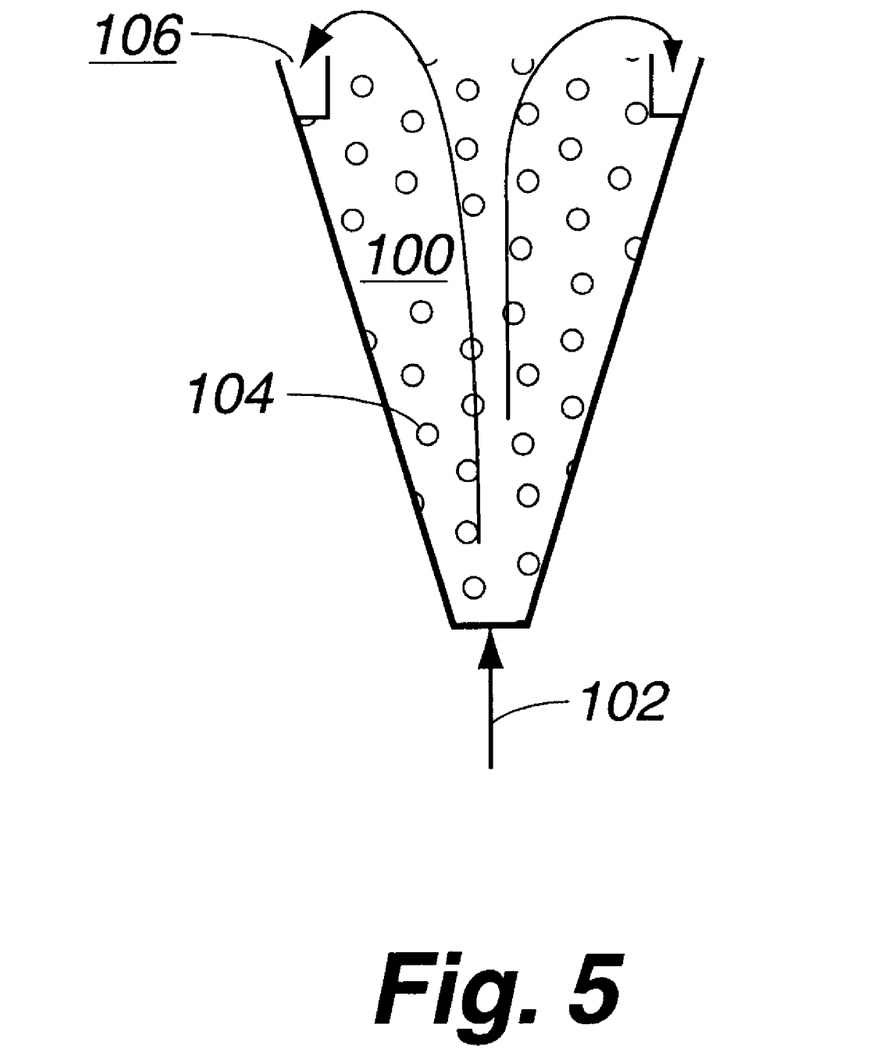

FIG. 5 is a schematic of a conical reactor configuration that is considered particularly useful as a sidestream treatment reactor in practice of the invention. The conical sidestream reactor 100 has an inverted cone shape with a large open top through which the nucleation site material is introduced. Water to be treated is introduced through an inlet 102 into the bottom narrow portion of the inverted cone so as to provide maximum contact of the water to be treated with the nucleation site material 104 in the cone as the water flows up through the nucleation site material. The water flows into a weir 106 about the inner circumference of the top of the cone-shaped reactor 100. The water is then pumped from the weir back into the evaporative cooling tower. The larger particles of nucleation site material settle to the bottom of the cone-shaped reactor where they can be removed by hydraulic pressure through a valve. Reactor operation can be continuous without stopping for removal of spent particles.

Water treatment in accordance with the present invention which uses an essentially non-soluble additive will produce a significantly lower quantity of waste water than the traditional lime/magnesia process. Continuous removal of adsorbable silica results in the capacity to operate a cooling tower at higher cycles of concentration with resultant water savings.

Following a drying procedure, landfill disposition can be readily approved for either raw unused silica particles or spent silica particles which are similar in composition to naturally occurring geological tuff. Because no caustic additions are required in the treatment process of this invention, no hazardous material is added to the treatment process and the resultant waste is free from hazardous waste.

The invention method is economical.

The following examples will demonstrate the operability of the invention.

EXAMPLE I

For comparative purposes, operating parameters of a conventional evaporative cooling tower were examined. The soluble (color reactive) silica concentration in the makeup water was approximately 90 mg/L. In the summer, under high heat load, the temperature drop across the cooling tower was from 90° F. to 75° F. The theoretical steady-state silica solubilities varied from 213 mg/L at 9° F. (32° C.) to 181 mg/L at 75° F. (24° C.). Because the kinetics of silica deposition are relatively slow, only a portion of the "supersaturation" may actually deposit in the water cooling tower and virtually none will deposit in the hotter heat exchanger. When operated at 2.2 cycles of concentration at 90° F., there was substantially no deposition of silica.

Hotter operation permits greater reliability of scale free operation at that same level of water consumption.

Then, in winter, the temperature variation was from 75° F. to 60° F. The theoretical solubilities ranged from 181 mg/L at 75° F. (24° C.) to 147 mg/L at 60° F. (15.5° C.). Scaling was anticipated. One solution was to continue to operate as was done during the warmer summer season, but as temperatures fell, to pinch down on water flow. As less water was being used, portions of the tower could be cut out of service. Recommended operating temperatures were the highest water temperatures that would still provide the required cooling for equipment protection.

EXAMPLE II

This example is a calculated illustrative bench top test of the principle of the invention to prove operability of the invention.

Several isotherm runs are made using samples of cooling tower water or water taken from a pilot plant evaporative process.

Each of the samples is chilled or heated to a different temperature, a temperature that would occur in each of various parts of a cooling tower system. Silica solubility and concentration at each temperature is tested using a molybdate reaction to form a color whose intensity is proportional to silica concentration. Samples are pre-stabilized at the test temperature using a test procedure available from Rohm and Haas as ACUMER TST$^{SM}$ Total Silica Test for High-Silica Waters.

A 30-mL sample is mixed with distilled water and the tetra-sodium salt of EDTA. The mixture is further diluted to 1-L with distilled water. The tetra-sodium salt form of EDTA is the most basic form of EDTA. As a base, it raises the pH in the sample, completely converting all amorphous silica to silicate ion. The chelation property of the EDTA chelates the hardness ions, predominantly calcium and magnesium, that might otherwise precipitate silicates.

Samples prepared and tested in this manner are calculated to give the same concentration and solubility results as when evaluated using optical emission spectroscopy.

Adsorption of silica from the cooling tower water or water taken from a pilot plant evaporative process is quantified by subsequent colorimetic testing of the water from each breaker showing lower concentrations of silica in the water and by weighing of the silica beads to determine the increase in weight attributable to adsorption of silica from the cooling tower water.

EXAMPLE III

In a calculated constructive reduction to practice, silica deposition is controlled and removed so that water is evaporated to 5 cycles of concentration (compared to the usual 2 to 2.5 cycles of concentration) and makeup water is reduced by 33 to 37.5%.

A fluidized bed reactor is filled with small spherical amorphous silica beads available from DeGussa AG, to provide a high surface area. For initial evaluation, the silica beads are from about 7 nm (300 m$^2$/g) to about 20 nm (m$^2$/g) and are relatively non-porous and non-soluble in water.

The fluidized bed reactor is connected by a sidestream or full-flow conduit to a bench-scale or test-scale evaporative cooling tower. The heat exchanger, fill, basin and circulating conduit are first cleaned manually or chemically or both so that the start up is with clean evaporative cooling tower surfaces.

Locally available water with a concentration of silica at near 100 mg/L and at pH less than 9.0 is used to supply the experimental or test evaporative cooling tower.

The silica dissolved or suspended in the water to be treated becomes less soluble as temperatures decrease. Equilibrium conditions suggest increasing silica removal through deposition with decreasing temperature. Opposing this driving force is the kinetics of the reaction, which generally proceeds faster with increasing temperatures. Testing is used to select the optimum temperature at which the silica deposits preferentially, at the highest observable rate, in the sidestream reactor rather than on the tower fill.

The sidestream reactor temperature may be reduced to a temperature lower than that in the cooling tower by tapping off a sidestream of the cooling tower chiller capacity. Alternatively, the reactor may be fed from the lowest temperature water in the circulation water system, generally the basin.

Equilibrium conditions do not appear to occur immediately when operation of the sidestream reactor is started. There is an indefinite period of time, generally hours to days, during which more silica is in suspension than will be in suspension when equilibrium is established.

Once equilibrium or steady-state is reached, the water being circulated through the cooling tower has a silica concentration less than the solubility predicted from the Morey et al., graph of FIG. 1 for the particular temperature in the reactor. The test system is operated at 3, 4, and 5 cycles of concentration when the feedwater contains near 100 mg/L silica.

The sphere size increases as silica sorption on the surfaces of the spheres occurs, resulting in higher settling velocities. Since the selected sphere size is large enough to have a settling velocity equal to the rise velocity in the reactor of the water to be treated, the spheres settle as they become larger. The larger spheres are separated from the smaller ones by varying the rise velocity of the water being treated in the reactor. Heavier "spent" spheres are removed from the process and fresh, small spheres are added to replace the spent spheres as required to maintain a constant amount of spheres and/or surface area.

The decreased solubility of silica resulting from the 15° F., or greater, temperature drop across the tower, particularly during winter operation of the cooling tower provides a driving force for silica removal by deposition on an alternate surface instead of on the tower fill.

While the compositions, processes and articles of manufacture of this invention have been described in detail for the purpose of illustration, the inventive compositions, processes and articles are not to be construed as limited thereby. This patent is intended to cover all changes and modifications within the spirit and scope thereof.

INDUSTRIAL APPLICABILITY

The invention process and equipment is useful for removal of silica from water, especially circulating water in a cooling tower, and particularly when there has been evaporation concentration and conditions facilitate deposition of the silica on surfaces in the cooling tower system.

What is claimed is:

1. A method of removing silica from evaporation cooling tower water comprising:
    (a) contacting said water to be treated with particles of a nucleation site material to produce a deposition of silica from said water to be treated onto said particles of said nucleation site materials, said nucleation site material comprising amorphous silica spheres, wherein the surface area of said nucleation site material is in the range from about 100 to about 100,000,000 times a surface area of wetted surfaces of the evaporative cooling tower; and
    (b) separating said particles of said nucleation site material from said water to be treated after said deposition of said silica upon said particles of said nucleation site material.

2. The method of claim 1 wherein said water to be treated is contacted with said particles of said nucleation site material in a sidestream reactor fluidly connected to said evaporative cooling tower.

3. The method of claim 1 wherein said water to be treated is contacted with said particles of said nucleation site material at a temperature lower than that of heat exchangers in said evaporative cooling tower.

4. The method of claim 1 wherein said water to be treated is contacted with said particles of said nucleation site material at a temperature in the range from about 40° F. to about 180° F.

5. The method of claim 1 wherein the pH of fluid in said sidestream reactor is in the range from about 8 to about 9.

* * * * *